June 19, 1923.

H. R. SEIFERT

MACHINE FOR MAKING PISTON RINGS

Filed July 23, 1921  4 Sheets-Sheet 1

1,459,117

Inventor
Henry R. Seifert
By his Attorneys
Merchant-Kilgore & Kilgore

June 19, 1923.
H. R. SEIFERT
1,459,117
MACHINE FOR MAKING PISTON RINGS
Filed July 23, 1921   4 Sheets-Sheet 2
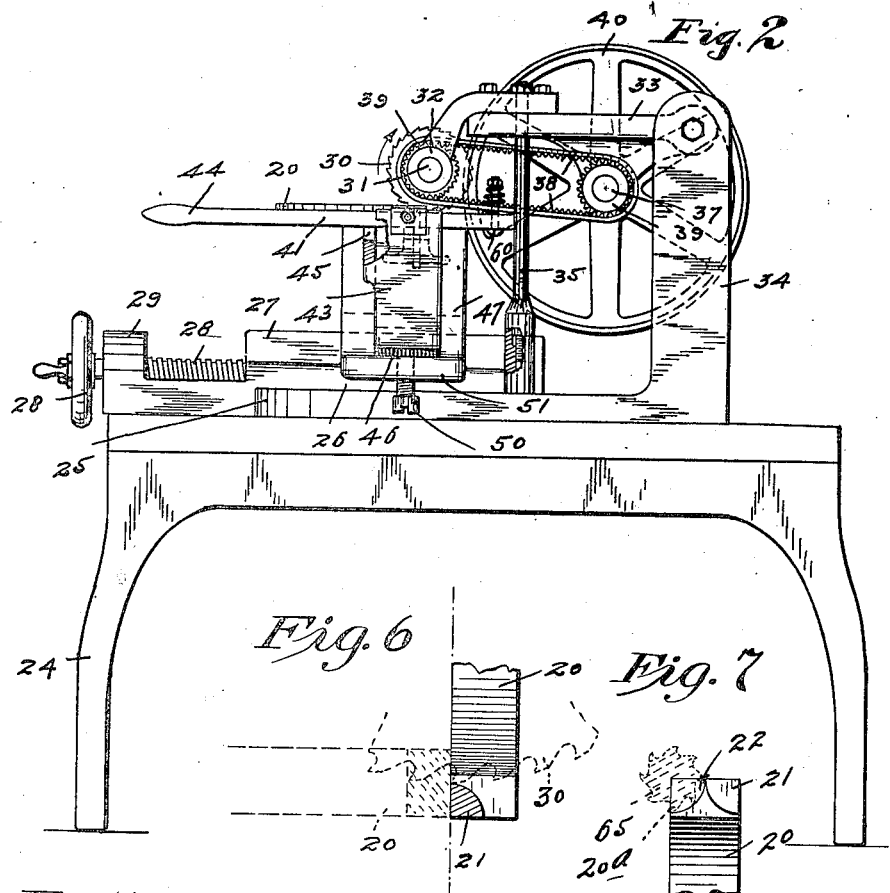
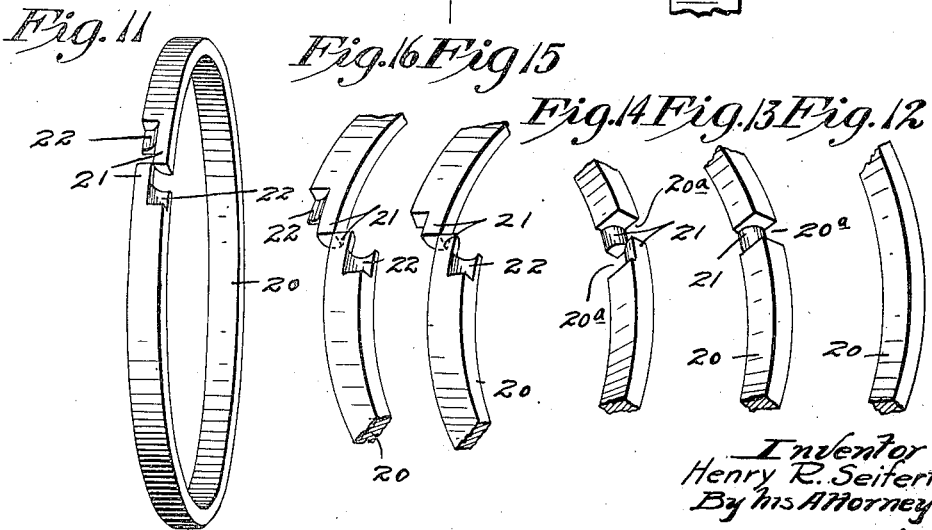
Inventor
Henry R. Seifert
By his Attorneys June 19, 1923.
H. R. SEIFERT
MACHINE FOR MAKING PISTON RINGS
Filed July 23, 1921    4 Sheets-Sheet 3
1,459,117
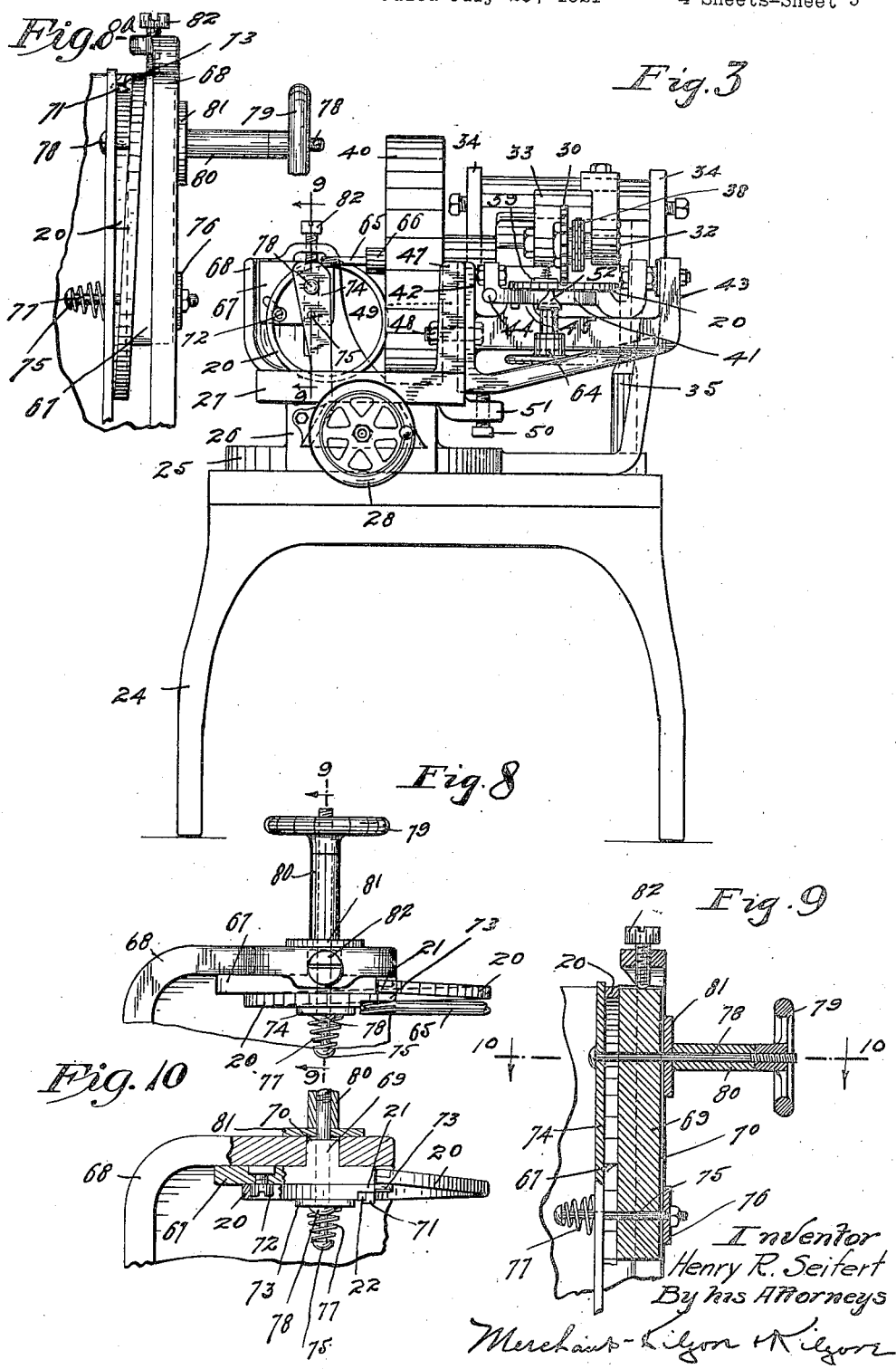

June 19, 1923.
H. R. SEIFERT
1,459,117
MACHINE FOR MAKING PISTON RINGS
Filed July 23, 1921   4 Sheets-Sheet 4
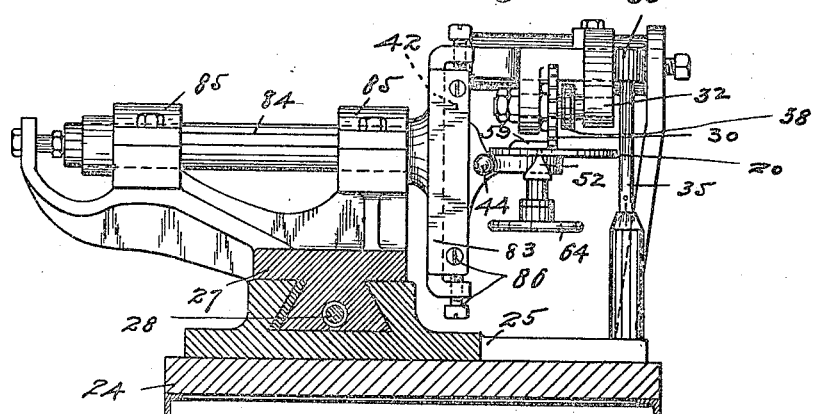
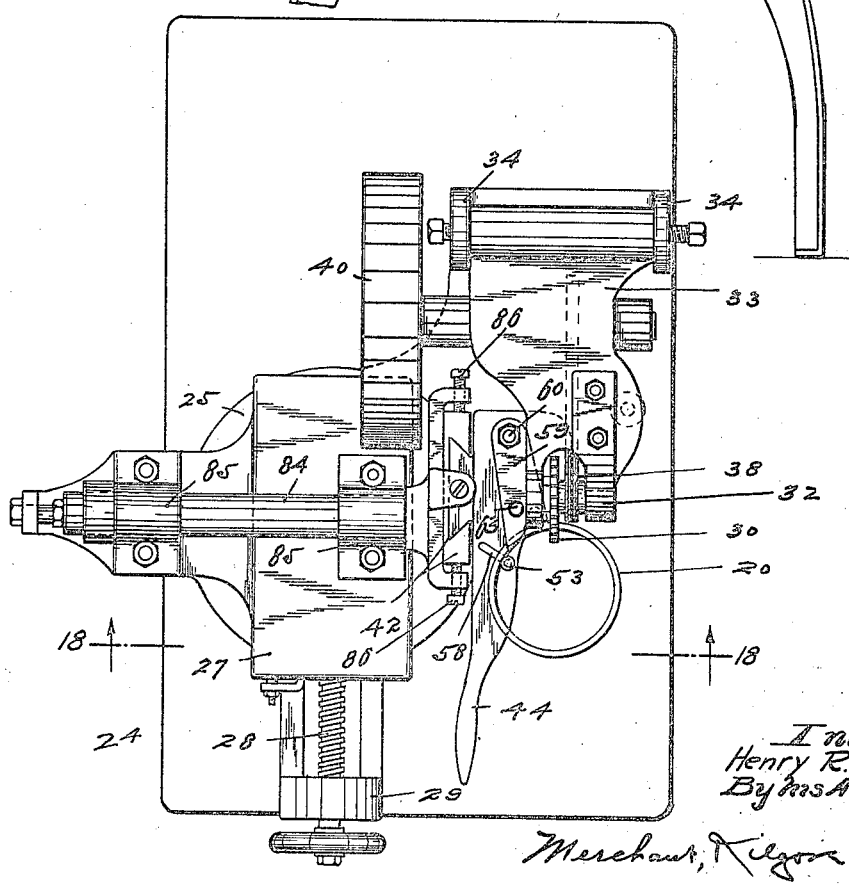
Inventor
Henry R. Seifert
By his Attorneys Patented June 19, 1923.

1,459,117

UNITED STATES PATENT OFFICE.

HENRY R. SEIFERT, OF EAST ELLSWORTH, WISCONSIN.

MACHINE FOR MAKING PISTON RINGS.

Application filed July 23, 1921. Serial No. 487,041.

*To all whom it may concern:*

Be it known that I, HENRY R. SEIFERT, am a citizen of the United States, residing at East Ellsworth, in the county of Pierce and State of Wisconsin, have invented certain new and useful Improvements in Machines for Making Piston Rings; and I do hereby declare the following to be a full, clear, and exact description of the invention, such as will enable others skilled in the art to which it appertains to make and use the same.

My present invention has for its object to provide a highly efficient machine for making piston rings and process of producing the same. Preferably, the rings used in carrying out the improved process may be primarily formed by the improved process described and broadly claimed in my co-pending application entitled "Improved process and apparatus for forming piston rings", filed July 18, 1921, Serial Number 485,686.

To the above end, generally stated, the invention consists of the novel devices and combinations of devices, hereinafter described and defined in the claims.

In the accompanying drawings, which illustrate the invention, like characters indicate like parts throughout the several views.

Referring to the drawings:

Fig. 2 is a right side elevation of the same;

Fig. 3 is a front elevation;

Fig. 6 is a fragmentary detail view on an enlarged scale of the ring and cutting wheel, said ring being indicated in different positions by means of broken lines and said cutting wheel being indicated by broken lines;

Fig. 7 is a fragmentary detail view on an enlarged scale of the ring and milling tool for forming the seats therein, some parts being indicated by means of broken lines;

Fig. 8 is a fragmentary detail view in plan of that portion of the machine designed for use in holding rings while forming the seats therein by means of a milling tool;

Figure 1:
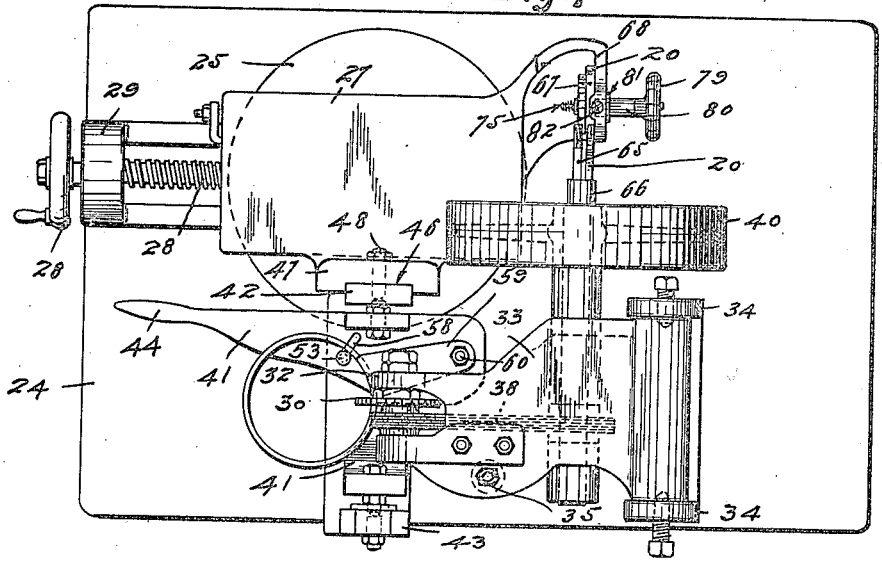
Fig. 1 is a plan view of the improved machine.
Figure 4:
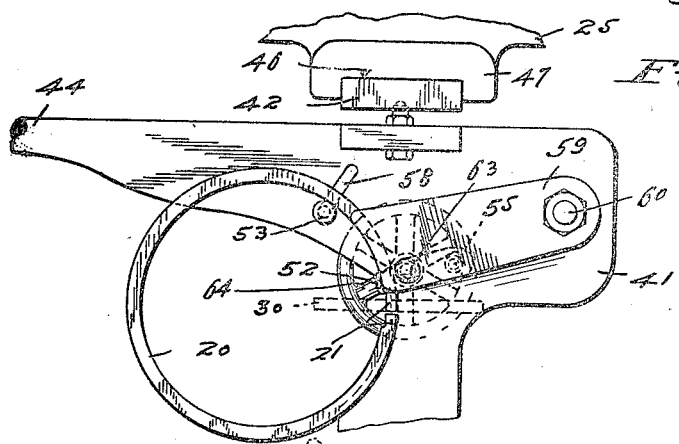
Fig. 4 is a fragmentary detail view in plan of that portion of the machine designed for use in holding piston rings while reducing the ends thereof by means of a cutting wheel diagrammatically illustrated by means of broken lines.

Fig. 8ª is a right side elevation of the parts shown in Fig. 8;

Fig. 9 is a vertical section taken on the line 9—9 of Figs. 3 and 8;

Fig. 10 is a view principally in section taken substantially on the line 10—10 of Fig. 9;

Fig. 11 is a perspective view of the improved piston ring;

Figs. 12 to 16, inclusive, are fragmentary perspective views illustrating the different steps in the process of producing the improved piston ring, as shown in Fig. 11;

Fig. 17 is a plan view showing a modified form of the machine; and

Fig. 18 is a view principally in front elevation with some parts sectioned on the line 18—18 of Fig. 17.

The piston ring 20 is provided with offset reduced ends 21 and 22. These reduced ends 21 are quadrantal in cross section and arranged to overlap when the piston ring is compressed and enter said seats, which have transversely concave bottoms formed on the same arcs as said ends.

Referring now in detail to the improved machine, the numeral 24 indicates a frame, to the top of which is rigidly secured a cast base 25 having guideways 26 on which is mounted a bed 27. This bed 27 is moved back and forth on the ways 26 by a handwheel-equipped screw 28 rotatively mounted in a bearing 29 on the base 25, held therein against endwise movement and having screw-threaded engagement with said bed.

For cutting the ring 20 to form the reduced ends 21 thereon, I provide a vertically disposed milling or cutting wheel 30 arranged to rotate in the direction of the movement of the bed 27 and thereabove. This cutting wheel 30 is mounted on an arbor 31 journaled in bearings 32 on the free end of a horizontal bracket 33 pivoted at its rear end to bearings 34 on the base 25. The front end of the bracket 33 is supported on a longitudinally adjustable two-part post 35 for raising or lowering movements to vertically adjust the cutting wheel 30. The two sections of the post 35 are connected by screw threads and the lower section thereof is rigidly secured to the base 25 and the upper end of the upper section of the post is extended through a bore in the bracket 33 with freedom for turning movement thereon and is secured thereto by an opposing shoulder and nut.

The cutting tool 30 is driven, in the direction of the arrow marked in Fig. 2, from a countershaft 37 by a sprocket chain 38, which runs over aligned sprocket wheels 39 on the arbor 31 and said countershaft. On the left-hand end of the countershaft 37 is keyed a pulley 40, over which runs a driving belt, not shown.

To hold the ring 20 while forming the reduced ends 21 thereon, there is provided a horizontally disposed face plate 41 intermediately pivoted to a vertically movable slide 42 and a bearing bracket 43 carried thereby. On the forward end of the face plate 41 is a handle 44, by which said face plate may be oscillated or held down in a horizontal position on a stop 45 formed with the bearing bracket 43. The slide 42 is mounted in a channel guideway 46 formed in the face of a column 47 with freedom for vertical adjustment. This slide 42 is frictionally clamped to the column 47 by a nut-equipped bolt 48, which extends through a bore in said slide and a vertical slot 49 in the column 47. Said slide 42 is further held and supported by a vertically disposed set screw 50, which directly engages the bracket 43 and has screw-threaded engagement with a lug 51 on the bed 27. By turning the screw 50 when the bolt 48 is loose, the slide 42 may be lowered or raised, at will, to set the face plate 41 in respect to the cutting wheel 30.

To position a ring on the face plate 41, in respect to the cutting wheel 30, there are provided circumferentially spaced stops 52 and 53 arranged to engage the internal surface of the ring and the latter of which stops is radially adjustable in respect to the ring. The stop 51 is formed with a plate 54 attached to the under side of the face plate 41 by a nut-equipped bolt 55 and held in contact therewith by a coiled spring 56 encircling said bolt. The bolt 55 is loosely adjusted to permit lateral movement of the plate 54 in respect to the face plate 41, and the spring 56 is compressed between the nut on said bolt and face plate 41 to yieldingly hold the plate 54 against the face plate 41. The stop 53, as shown, is the head of the nut-equipped bolt 57 mounted in a radial slot 58 in the face plate 41. By adjusting the bolt 57 in the slot 58, the stop 53 may be positioned for rings of different diameters.

After a ring is positioned on the face plate 41 in respect to the cutting wheel 30, by the stops 52 and 53, the same is rigidly secured to said face plate by a clamping bar 59, secured at its rear end to the face plate 41 by a nut-equipped bolt 60 with freedom for raising and lowering movement in respect to said face plate. A washer 61, of substantially the same thickness as the width of the ring 20, is placed on the bolt 60 between the face plate 41 and clamping bar 59, and a coiled spring 62 encircling the bolt 60 is compressed between the clamping bar 59 and nut on said bolt and yieldingly holds said clamping bar on the washer 61. The forward end of the clamping bar 59 is arranged to rest upon that portion of a ring which lies between the stops 52 and 53 and is pressed thereon by a bolt 63, which extends through aligned bores in said clamping bar 59 and face plate 41 and is provided with a hand-wheel-equipped nut 64. This bolt 63 also extends through a bore in the plate 54 and rigidly secures said plate to the face plate 41. Preferably, as shown, the front end of the clamping plate 41 is made concave to substantially follow the contour of the inner face of a ring held thereby.

To form the seats 22 in the ring 20, there is provided a milling tool 65 secured by a clutch 66 to the left-hand end of the countershaft 37. In forming the seats 22, the ring 20 is held by devices in much the same manner in which it is held when forming the ends 21, and which devices include a vertically disposed face plate 67 mounted for sliding movement on a column 68 on the bed 27. On the back of the face plate 67 is a vertical rib 69 fitted in a vertical slot 70 in the column 68, with freedom for endwise sliding movement.

For holding a ring positioned on the face plate 67, in respect to the milling tool 65, fixed and movable stops 71 and 72, respectively, which correspond to the stops 52 and 53, respectively, on the face plate 41, are provided. When forming a seat 22 in one end of the ring 20, the other end thereof is held sprung laterally out of alignment therewith and toward the column 68, to afford clearance for the milling tool 65, by an outstanding lug 72 on the right-hand edge of the face plate 67.

The ring 20 is clamped on the face plate 67, between the stops 71 and 72, by the upper end of a vertically disposed clamping bar 74, the lower end of which overlaps the ring at a diametrically opposite point, and holds said ring flat against the face plate 67 and against twisting action produced by the end of the ring held in offset positions by the lug 73. A bolt 75 is provided for holding the face plate 67 in different adjustments on the column 68 and the clamping bar 74 in assembled relation to said face plate. This bolt 74 extends through aligned bores in the intermediate portions of the face plate 67 and clamping bar 74 and is provided with a washer 76 which spans the slot 70 and engages the back of the column 76 as a base of resistance for the bolt 74. Said bolt 72 is of such length as to permit lateral movement of the clamping bar 74 and, to yieldingly take up this movement, a coiled spring 77 is provided, which encircles the bolt 75 and is compressed between its head and said clamping bar. Obviously, the bolt 75 and the coiled spring 77 yieldingly hold the clamping bar 74 against the ring 20, and the face plate 67 against the column 68.

A variable pressure is applied to the clamping bar 74 to rigidly hold the ring on the face plate 67 against the column 68 by means of a bolt 78 having a hand-wheel-equipped nut, and which bolt extends through bores in the clamping bar 74 and face plate 67 between the bolt 75 and fixed lug 71. This nut 79 reacts against a thimble 80 on the bolt 78, and said thimble, in turn, reacts against a washer 81, which spans the slot 70 and engages the back of the column 68 as a base of resistance. To position and limit the vertical adjustment of the face plate 67, there is provided a stop 82 in the form of a set screw having screw-threaded engagement with a part on the column 68.

Figure 5:
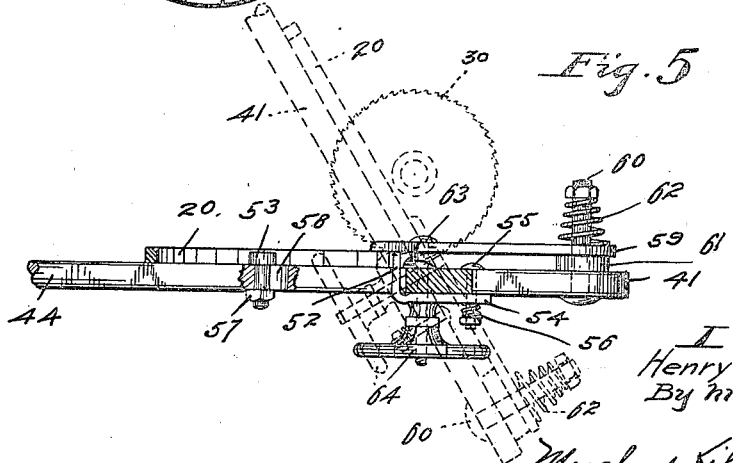
Fig. 5 is a side elevation of the parts shown in Fig. 4, certain of said parts being shown in different positions by means of broken lines.

The operation of making piston rings on the above described machine may be briefly described as follows:

As previously stated, the rings are primarily cast endless, as shown in Fig. 12, and of greater circumference than required, when finished. These endless rings are first placed one at a time on the face plate 41, positioned in respect to the cutting wheel 30 by the stops 52 and 53, and then rigidly secured by the clamping bar 59. The ring is then moved into contact with the cutting wheel 30 by operating the feed screw 28 to move the bed 27 toward the rear of the machine, which cuts a radial notch 20ª in one side of the ring, as indicated by broken lines in Fig. 7 and by full lines in Fig. 13. The depth of this notch 20ª is governed by raising or lowering the cutting wheel 30 by means of the posts 35. When the cutting of the notch 20ª, as to depth in respect to the outer face of the ring, is complete, the movement of the bed 27 is stopped and the face plate 41 rocked on its axis by means of a handle 44 into a position, as shown by broken lines in Fig. 5. This rocking of the face plate again feeds the ring to the cutting wheel 30, which continues the cutting of the notch 20ª completely across the inner face of the ring to the other side thereof, as shown by full lines in Figs. 6 and 13. This last action of the cutting wheel 30 produced by rocking of the face plate 41, transversely cuts the inner face of the ring from the notch 20ª to the opposite side of the ring on an arc of a circle which extends from the outer face of the ring at the bottom of said notch to the opposite side of the ring in which said notch 20ª is cut. The axis of the arc cut during the rocking movement of the face plate 41 is aligned with the axis of the pivot of said face plate. The ring is then removed from the face plate 41, turned other side up and again secured to said face plate, with one side of the cutting wheel 30 aligned with one side of the notch 20ª. The bed 27 and face plate 41 are then operated in succession to cut a second notch 20ª in the opposite side of the piston ring and circumferentially offset in respect to the first notch. The very act of completing the second notch 20ª severs the ring between the two reduced ends 21.

The ring 20 is then secured to the face plate 67, as previously described, and one end thereof is held offset from the other by the lug 73 to afford clearance for the milling tool 65. The feed screw 28 is then operated to move the bed 27 toward the front of the machine to carry the ring laterally toward the milling tool 65 to cut, in one of its longitudinal edges, one of the seats 22, as shown in Fig. 15. The radius of the milling tool 65 is substantially the same as the radius of the arc on which the inner surface of one of the ends 21 is formed and thereby forms a seat 22, which is completely transversely filled by one of the ends 21 when the ring is compressed. The ring is then reversed on the face plate 67 and the other seat 22 cut therein in a like manner.

Referring now in detail to the modifications shown in Figs. 17 and 18, the slide 42, which in this instance is made in two sections, is mounted in a flanged head 83 on one end of a horizontal shaft 84 mounted in bearings 85 on the bed 27. The sections of the slide 42 are held in the head 83 for vertical and horizontal adjustments by set screws 86. Obviously, the horizontal shaft 84 permits the required swinging movement of the face plate 41 in feeding rings to the cutting wheel 30 from the curved innner surfaces on the ends 21 thereof.

The improved process of forming piston rings consists, first in forming an endless ring having a circumference greater than required when the piston is complete, second in cutting a notch in one side of the ring and extending the same on the arc of a circle which extends from the outer face of the ring at the bottom of the notch across the inner face of the ring to the opposite side thereof, third in forming a like notch in the other side of the ring circumferentially offset from the first notch with its bottom and one of its sides aligned with the bottom and one of the sides of the other notch and severing the ring on the aligned sides of the two notches, which leaves the ring with reduced ends arranged to overlap when the ring is compressed, and fourth in forming seats with transversely curved bottoms in the circumferential outer edges of the ring to receive the reduced ends of the ring when compressed.

What I claim is:

1. A machine for forming piston rings comprising a tool having a peripheral cutting surface, and a face plate for holding a piston ring with one of its ends substantially tangential to the axis of the tool.

2. A machine for forming piston rings comprising a tool having a peripheral cutting surface, a face plate for holding a piston ring with one of its ends substantially tangential to the axis of the tool, and means for feeding the face plate to move the piston ring axially toward the cutting surface of the tool.

3. The structure defined in claim 1 in further combination with means for holding one of the ends of the piston ring laterally offset in respect to the other.

4. The structure defined in claim 2 in further combination with means for causing the tool to stop its cutting action on the piston ring at the transverse center of its periphery.

5. The structure defined in claim 2 in further combination with an adjustable stop for the face plate to limit the cutting action of the tool for piston rings of different widths.

6. The structure defined in claim 2 in further combination with means for adjusting the piston ring radially in respect to the cutting surface of the tool.

7. The structure defined in claim 2 in further combination with means for adjusting the piston ring axially in respect to the cutting surface of the tool.

8. The structure defined in claim 2 in further combination with means for adjusting the piston ring both radially and axially in respect to the cutting surface of the tool.

9. A machine for forming piston rings comprising a tool having a peripheral cutting surface, an oscillatory face plate, the axis of which is substantially parallel to the axis of the tool, means for securing a piston ring to the face plate with its periphery substantially tangent to the axis of the face plate, said face plate being movable from one position to another to carry the piston ring held therein in such relation to the tool as to cause said tool to cut a quarter round surface on the piston ring transversely thereof.

10. The structure defined in claim 9 in which the axis of the face plate may be adjusted in a plane parallel to a plane intersecting the axis of the tool to move the face plate in such relation to the tool as to cause the same to cut a surface on the piston ring that is substantially tangential to the quarter round surface.

11. The structure defined in claim 9 in which the face plate may be bodily adjusted, in respect to its axis, in a plane that is parallel to a plane intersecting its axis.

12. The structure defined in claim 9 in which the face plate may be bodily adjusted, in respect to its axis, at right angles to a plane intersecting its axis.

13. The structure defined in claim 9 in which the face plate may be bodily adjusted, in respect to its axis, in a plane that is parallel to a plane intersecting its axis and at right angles to said plane.

14. A machine for forming piston rings comprising a tool having a peripheral cutting edge, an oscillatory face plate, the axis of which is substantially parallel to the axis of the tool, means for securing a piston ring to the face plate with its periphery substantially tangent to the axis of the face plate and extending tangentially away from the tool, said face plate being movable to swing the piston ring substantially on the axis thereof.

15. The structure defined in claim 14 in which the face plate may be moved to swing the piston ring substantially on the axis thereof and into a position in which the tool extends within the piston ring.

16. The structure defined in claim 14 in which the tool may be adjusted radially.

17. A machine for forming piston rings comprising an oscillatory bracket, a tool journaled on the bracket and having a peripheral cutting surface, an oscillatory face plate, the axis of which is substantially at the axis of the tool, means for securing a piston ring to the face plate with its periphery substantially tangent to the axis of the face plate and extending tangentially away from the tool, said face plate being movable to swing the piston ring substantially at the axis thereof and into a position in which the free end of the bracket and the tool extend within the piston ring.

18. The structure defined in claim 17 in which the bracket is adjustable to radially move the tool.

In testimony whereof I affix my signature.

HENRY R. SEIFERT.